United States Patent
Tirelli

[11] 3,899,003
[45] Aug. 12, 1975

[54] FLUID DYNAMIC VALVE WITH DIRECT ELECTROMAGNETIC CONTROL WITH SLIDER-LATCHING DEVICE

[75] Inventor: Paolo Tirelli, Cinisello Balsamo (Milan), Italy

[73] Assignee: Atos Oleodinamica S.p.A., Milan, Italy

[22] Filed: May 10, 1974

[21] Appl. No.: 468,888

[30] Foreign Application Priority Data
Jan. 2, 1974 Italy.................................. 19001/74

[52] U.S. Cl............................ 137/625.65; 251/297
[51] Int. Cl........................................... F16k 31/06
[58] Field of Search.................. 137/625.65, 596.17; 251/297, 129, 137

[56] References Cited
UNITED STATES PATENTS

| | | | |
|---|---|---|---|
| 2,967,545 | 1/1961 | Schmidt.......................... | 251/137 X |
| 3,608,586 | 9/1971 | Daggy, Jr........................ | 251/297 X |
| 3,701,366 | 10/1972 | Tirelli ............................ | 137/625.65 |

FOREIGN PATENTS OR APPLICATIONS
274,578   5/1914   Germany ........................... 251/297

*Primary Examiner*—Martin P. Schwadron
*Assistant Examiner*—Robert J. Miller
*Attorney, Agent, or Firm*—Diller, Brown, Ramik & Wight

[57] ABSTRACT

A mechanical latching device is disclosed, for locking in either of the active positions as determined by a control electromagnet, the valve slider of an electromagnetically actuated valve for hydraulic mechanisms. The latching device in question is characterized in that the resilient latching members proper act on preferably cylindrical pushers inserted between the slider and the movable component parts of the electromagnet, said pushers being compelled to follow the slider movements. The preferred, but not exclusive application of the improved latching means is in the so-called oil-bath type electromagnetic valves in which the movable armature of the electromagnet floats in an oil-filled chamber formed in the valve body.

6 Claims, 7 Drawing Figures

PATENTED AUG 12 1975

3,899,003

FLUID DYNAMIC VALVE WITH DIRECT ELECTROMAGNETIC CONTROL WITH SLIDER-LATCHING DEVICE

This invention relates to distribution valves for fluid dynamic mechanisms, having a slider controlled electromagnetically (electromagnetic valves) equipped with a mechanical slider-latching device capable of stably maintaining the slider in its several working positions even when the thrust action of the electromagnet which has caused the attainment of said position has ceased. For fluid-dynamic electromagnetic valves there are intended valves in which the distribution of the hydraulic flow takes place by the agency of a slider (round, square, etc.) which is linearly displaced and positioned by the movable member of the electromagnet within the valve body; such slider is capable of opening or closing bores formed through the valve body, thus establishing a communication, through connections internal to the valve, between several branches of the fluid-dynamic circuitry. With fluid-dynamic circuits (hydraulic proper and oil-actuated) there are intended those circuits which utilize for their operation appropriate liquids, also other than oil, but have certain lubricating properties, and more particularly nonflammable synthetic liquids (phosphoric esters and/or chlorinated hydrocarbons) or emulsions of water, glycols, water and oil and so forth.

The latching devices as applied to the slider fluid-dynamic valves fulfil the task of maintaining the slider in the working position when the action of the electromagnet is over, withstanding to possible hydro-dynamic forces, gravity pull and others and of permitting the axial displacement of the slider only as a result of a command (energization of an electromagnet, mechanical actuation etc.). In the fluid-dynamic valves as at present available, mechanical latching devices are embodied by means of a resilient fork which is appropriately shaped and integral with the valve body and oriented perpendicularly to the slider axis. The fork in question is in contact with the central portion of the slider having the least diameter, where there are usually two radial grooves such as to permit the preferential housing of the resilient fork, and, consequently, the latching when the slider reaches, as a consequence of an electromagnetic command, a position wherein the fork can penetrate a groove; of course the maximum distance between the grooves formed on the slider is equal to the overall stroke the slider can travel over.

The defects associated with such an approach are both of constructional and functional nature; the resilient fork, integral with the valve body, is inserted at the base and is for a fair portion of its length not constrained.

Thus the fork works in a cantilever fashion and can undergo bendings of considerable magnitude when it has no resting surface along its lying plane; this fact involves the impossiblity of reliably maintaining in position the slider, even under the action of small forces, and the origination of considerable flexural stresses with the hazard of deformation breakages and breakage due to fatigue: the adoption of a fork having a wire with an enlarged diameter or a greater stiffness is not any remedy in that the size of the grooves (and thus of the wire forming the fork) are limited by the stroke, which is generally small, of the slider and the elastic reaction of the fork against the slider has a radial resultant which is not zero, that which is conducive to possibility of the slider becoming misaligned.

The subject matter of the present invention is a latching device which does away with the drawbacks enumerated above, has favorable characteristics as to its use and is characterized by having the resilient latching members acting upon pushers, preferably circular cylindrical pushers, inserted between the slider and the movable portions of the electromagnet and compelled to follow the slider movements.

The main advantages afforded by the latching device which is the subject matter of the present invention are essentially connected with the possibility of using the resilient latching members appropriately rested, along a wide portion of their surface, against a planar wall so as to reduce the flexural stresses of the resilient structure to extremely reduced values.

Since the resilient latching members rest on a surface, they can unfold a locking action against forces of an even considerable magnitude without experiencing appreciable deformations and thus ensure the maintenance of the desired axial positioning for the slider. In addition, the resilient means can be made with a metal wire having even a very small gauge, that which permits to make on the pushers small latching grooves which are thus compatible also with very reduced pusher strokes. Other advantages afforded by the latching device the subject of the present invention are connected with the possibility of installing the resilient means concentrically with the slider and the pushers, that which enables the resilient means to be shaped in a semiclosed form which is thus sturdier. In addition, the resilient means, by concentrically acting upon the slider, can exert a balanced action along wide arcs of a circumference thus providing a reliable latching action without originating thrusts having a radial resultant.

The mechanical latching device according to the present invention is preferably, but not compulsorily, employed in electromagentic valves of the so-called oil-bath type in which the movable armature of the electromagnet floats in a chamber filled with the hydraulic fluid which can flow from the valve body into said chamber For better clarity of showing, a preferred embodiment of the mechanical latching device according to the invention as applied to a fluid-dynamic oil-bath-type electromagnetic valve, with electromagnets imparting a thrust action on the slider, will now be described with reference to the accompanying drawing, wherein:

Figure 1:
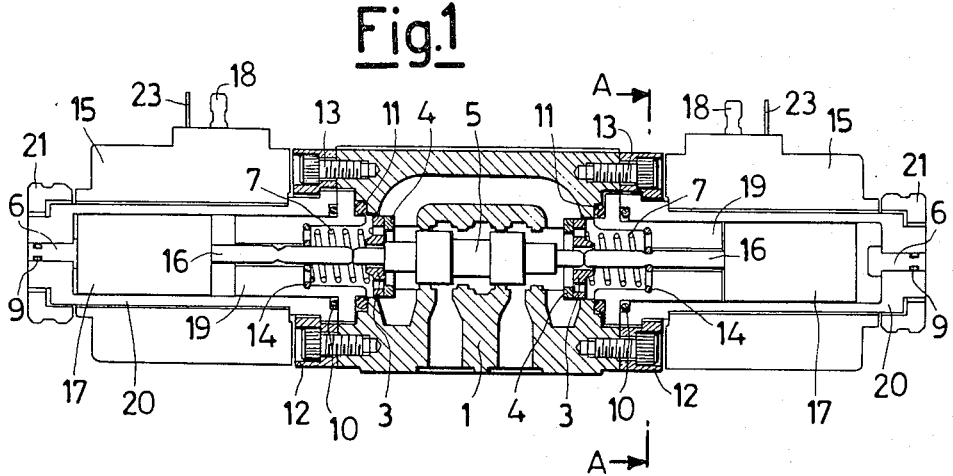
FIG. 1 is a longitudinal cross-sectional view of an electromagnetic valve of the so-called oil-bath type, with two electromagnets, two positions with mechanical latching of the slider in the end positions.
Figure 2:
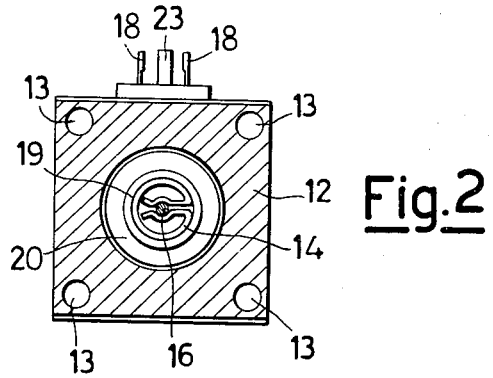
FIG. 2 is a cross-sectional view taken along the line A—A of FIG. 1 in which the shape of the resilient latching means is shown in detail.
Figure 3:
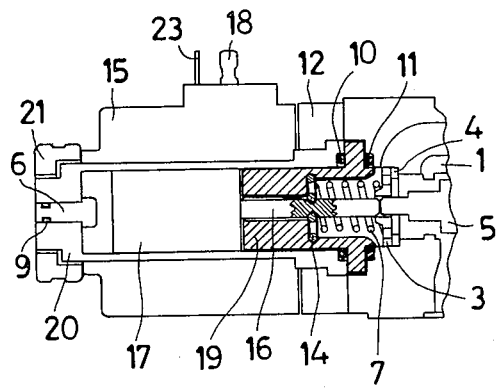
FIG. 3 is a cross-sectional view of a portion of an electromagnetic valve in which the latching device is shown in detail with its housing in the magnetic counter armature, and the rod on which the latching is effected.

With particular reference to FIGS. 1, 2 and 3, the electromagnetic valve comprises a valve body 1 of alloyed cast iron and in whose parallelepipedal outline there are obtained, at casting, shaped bores so as to allow the flow of the hydraulic fluid and a slider 5 which, taken the positions allowed thereto, either opens or closes the passageway ports allowing the oil to flow in the desired directions.

Upon the slider 5 the disks 3 are active which are urged by the springs 7 and abut the body 1 through the spreader 4, and thus the positioning of the slider 5 is ensured with a high accuracy in the two end positions.

At the two ends of the body 1, the pressure-tight cylinder 20, maintained in position by the flange 12 made integral with the body 1 by the screws 13, presses the sealing ring 10 against the magnetic counter armature 19, which, in turn, presses the sealing ring 11 against the valve body.

The result is thus that the sealing rings 10 and 11, properly pressed into their seatings, prevent oil oozings through the contact surfaces between the body 1 and the pieces 19 and 20.

The pressure-tight cylinder 20 is firmly affixed to the valve body 1 and is filled with the hydraulic fluid which flows from the valve body 1 into the cylinder 20 through the axial bore of the counter armature 19 and has at its end the manually actuable pusher 6 which is peripherally sealed by the gasket 9.

Within the pressure-tight cylinder 20 slides the movable magnetic armature 17 which transfers the drive to the slider 5 by the rod 16 which is fastened to the armature 17 and is passed through an axial bore formed in the magnetic counter armature 19. The armature 17 slides with its surface in contact with the cylinder 20 and thus is exactly guided during its motion.

On the pressure-tight cylinder 20 is slipped the coil 15, held by the ferrule 21 which engages a screw thread formed in the end position of the pressure-tight cylinder 20, on the outer surface of the coil 15 project the electric terminals 18, which are metal plates connected to the electric coiling, and the ground terminal 23 which is connected with the iron component parts of the coil 15.

The magnetic counter armature 19 has, on the side confronting the valve body 1, a straight cylindrical hollow, with a cavity with round cross-sectional arranged radially of the planar surface of said cylindrical hollow space. Said radial cavity houses the resilient latching means 14 which are pressed against the planar surface of said cylindrical cavity by previously compressed springs 7.

The resilient latching means 14 adhere to the outer surface of the rod 16 and can penetrate the grooves formed in the rod 16 when their positions coincide.

The resilient latching means 14 are formed by spring steel wires and are so shaped as to have a planar semi-closed form, constituted by a round portion which is housed in the radial cavity of the counter armature 19, a round portion adhering to the rod 16 and portions having a radial orientation which are compressed between the planar surface of the counter armature 19 and the previously compressed helical spring 7.

As the electromagnetic valve is energized by sending electric current to the coil 15 through the terminals 18, the movable armature 17 is attracted against the counter armature 19 and thrusts, by the agency of the pusher 16, the slider 5 which is compelled to slide relative to the body 1 thrusting, in turn, the armature 17 which is on the other side of the valve body 1.

The stoppage of the movement of the slider 5 takes place as the armature 17 frontally enters in contact with its counter-armature 19 and the cavity of the rod 16 is so positioned as to coincide with the resilient latching means 14 inserted in the counter armature 19.

The resilient means 14 thus enter the groove of the rod 16 which is thus firmly held.

As the attraction action between the armature 17 and the counter armature 19 is over, the slider 5 is held in its position on one side by the disk 3, against which the slider 5 is resting, and on the other side, by the rod 16 which cannot slide axially as it is held by the latching members 14.

The energization of the coil 15 placed on the other side causes a vigorous attraction of the armature 17 towards its counter armature 19, the transfer by means of the rod 16 of the thrust to the slider 5 which, in its turn, transfers it to the rod 16 placed on the other side and which is compelled to slide axially against the bias of the resilient means 14 which penetrated the groove of the rod 16.

The resilient means 14, as they are integrally bound to their lying plane are compelled to deformation in the sense of widening their internal round portion.

The motion of the armatures 17, rods 16 and slider 5 continues to the stoppage of the armature 17 against the counter armature 19 and the penetration of the latching means 14 into the groove of the rod 16.

Figure 4:
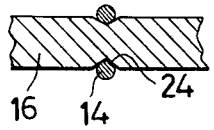
FIG. 4 shows a preferred embodiment of the triangular groove which is present in the rod.

With reference to FIG. 4, the rod 16 has a groove 24 with a triangular cross-section against which rests the internal portion of the resilient means 14.

Figure 5:
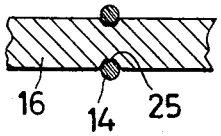
FIG. 5 shows a preferred embodiment of the trapezoidal groove formed on the rod.

With reference to FIG. 5, the rod 16 has a groove 25 with a trapezoidal cross-section in which rests the internal portion of the resilient means 14.

Figure 6:
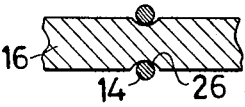
FIG. 6 shows a preferred embodiment of the semicircular groove formed on the rod.

With reference to FIG. 6, the rod 16 has a groove 26 with a semicircular cross-section in which rests the internal portion of the resilient means 14.

Figure 7:
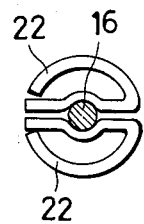
FIG. 7 shows another preferred embodiment of the resilient latching means.

With reference to FIG. 7, another preferred embodiment diment for the resilient latching means is formed by two discrete elements of a metal wire 22 shaped and confrontingly placed so as to form as an assembly a planar figure which can be assimilated to the one obtained by superposing two circumferences connected by radially oriented segments.

What is claimed is:

1. An electromagnetic actuated hydraulic valve comprising a valve body having a plurality of channels for the flow of a hydraulic fluid, a slider mounted for sliding movement within said valve body to control the flow of fluid within said channels, electromagnet means mounted on said valve body and including an electric coiling, a cylinder fixedly secured to said body within said coiling, a fixed magnetic counter armature having a coaxial throughbore, a movable magnetic armature slidably guided within said cylinder, a pusher freely extending through said counter armature coaxial with said cylinder between said movable armature and said slider for transferring motion of said movable armature to said slider, said pusher having the shape of a cylindrical rod with at least one annular groove and being carried by said movable magnetic armature, said magnetic counter armature having in that end thereof remote from said movable armature a cylindrical axial cavity terminating at an inner end in a plane wall disposed normal to said pusher, resilient mechanical latching means at least partially seated in said cavity for permitting the sliding of said slider by said pusher in the axial direction under the action of said movable armature while ensuring the stoppage of said slider in certain predetermined positions when the thrust action of said movable armature ceases overcoming forces tending to axially displace said slider; said resilient latching means including a wire means disposed in a plane and being shaped to comprise two symmetrical substantially semicircular inner portions radially urged against said pusher passing therebetween so as to contact the major part of the circumferential surface of the pusher and being snapable into said annular groove thereof, and two symmetrical substantially semicircular outer portions, radially urged against the inner wall of the cylindrical cavity of said counter armature so as to contact the major part of the circumferential surface thereof.

2. The valve of claim 1 wherein each of said semicircular inner portions is connected to a respective one of said semicircular outer portions by a generally diametrical straight portion.

3. The valve of claim 1 wherein each of said semicircular inner portions is disposed intermediate ends of a generally diametrical straight portion connected to a respective one of said semicircular outer portions.

4. The valve of claim 1 wherein each of said semicircular inner portions is connected to a respective one of said semicircular outer portions and said outer semicircular portions are integrally connected.

5. The valve of claim 1 wherein each of said semicircular inner portions is connected to a respective one of said semicircular outer portions and said outer semicircular portions are separately formed.

6. The valve of claim 1 wherein each of said semicircular inner portions is disposed intermediate ends of a generally diametrical straight portion connected to a respective one of said semicircular outer portions, said outer semicircular portions are separately formed, and said straight portion ends are disposed between adjacent ends of said outer semicircular portions.

* * * * *